(12) United States Patent
Krpo et al.

(10) Patent No.: US 11,220,194 B2
(45) Date of Patent: Jan. 11, 2022

(54) SLIDING DEVICE FOR A VEHICLE SEAT PROVIDED WITH AN IMPROVED LOCKING ARRANGEMENT

(71) Applicant: MARTUR ITALY S.R.L., Milan (IT)

(72) Inventors: Azra Krpo, Grugliasco (IT); Can Üstünberk, Grugliasco (IT)

(73) Assignee: MARTUR ITALY S.R.L., Milan (IT)

( * ) Notice: Subject to any disclaimer, the term of this patent is extended or adjusted under 35 U.S.C. 154(b) by 0 days.

(21) Appl. No.: 16/616,601

(22) PCT Filed: Apr. 17, 2019

(86) PCT No.: PCT/IB2019/053183
§ 371 (c)(1),
(2) Date: Nov. 25, 2019

(87) PCT Pub. No.: WO2019/243903
PCT Pub. Date: Dec. 26, 2019

(65) Prior Publication Data
US 2020/0391620 A1 Dec. 17, 2020

(30) Foreign Application Priority Data
Jun. 21, 2018 (IT) .................. 102018000006569

(51) Int. Cl.
*B60N 2/08* (2006.01)
(52) U.S. Cl.
CPC ......... *B60N 2/0806* (2013.01); *B60N 2/0818* (2013.01); *B60N 2/0875* (2013.01); *B60N 2/0887* (2013.01)
(58) Field of Classification Search
CPC ...... B60N 2/08; B60N 2/0806; B60N 2/0887; B60N 2/0705; B60N 2/0715;
(Continued)

(56) References Cited

U.S. PATENT DOCUMENTS 5,806,825 A * 9/1998 Couasnon ............ B60N 2/0705
248/429
6,079,688 A * 6/2000 Levillain .............. B60N 2/0715
248/429
(Continued)

FOREIGN PATENT DOCUMENTS

AU  2011226990 A1  11/2012
CN  104553894 A    4/2015
(Continued)

OTHER PUBLICATIONS

International Search Report and Written Opinion of the International Searching Authority dated Aug. 21, 2019 for International Patent Application No. PCT/IB2019/053183.

*Primary Examiner* — Jonathan Liu
*Assistant Examiner* — Guang H Guan
(74) *Attorney, Agent, or Firm* — Howson & Howson LLP

(57) ABSTRACT

A sliding device for a vehicle seat is provided with a locking arrangement including a pair of locking assemblies, one for each track of the sliding device. Each track has an upper rail and a lower rail, and each of the locking assemblies includes a plurality of locking pins for locking one of the upper rails to a respective one of the lower rails. The locking arrangement further includes a releasing assembly for driving the locking pins of the locking assemblies to an unlocking configuration. The releasing assembly comprises a releasing member and a pair of connecting members, each of which is connected in a force transmission connection with the releasing member and the plurality of locking pins of one of the locking assemblies. Each of the connecting members is entirely received inside a respective one of the tracks, whereby the locking arrangement has a very compact design.

9 Claims, 6 Drawing Sheets

(58) Field of Classification Search
CPC .. B60N 2/0812; B60N 2/0818; B60N 2/0825; B60N 2/0831; B60N 2/0862; B60N 2/0875; B60N 2/0881
See application file for complete search history.

(56) References Cited

U.S. PATENT DOCUMENTS

| | | | | |
|---|---|---|---|---|
| 6,623,363 | B2* | 9/2003 | Guptill | F16D 3/387 |
| | | | | 29/DIG. 3 |
| 6,637,712 | B1 | 10/2003 | Lagerweij | |
| 6,764,054 | B2* | 7/2004 | Becker | B60N 2/0707 |
| | | | | 248/424 |
| 7,165,753 | B2* | 1/2007 | Oh | B60N 2/0825 |
| | | | | 248/429 |
| 7,191,995 | B2* | 3/2007 | Kim | B60N 2/0705 |
| | | | | 248/429 |
| 7,600,816 | B2* | 10/2009 | Bauersachs | B60N 2/0806 |
| | | | | 248/429 |
| 7,980,525 | B2 | 7/2011 | Kostin | |
| 8,382,057 | B2* | 2/2013 | Napau | B60N 2/0881 |
| | | | | 248/423 |
| 8,474,777 | B2 | 7/2013 | Nihonmatsu et al. | |
| 8,550,420 | B2 | 10/2013 | Wojatzki et al. | |
| 8,708,300 | B2* | 4/2014 | Fujishiro | B60N 2/4214 |
| | | | | 248/429 |
| 9,067,514 | B2 | 6/2015 | Oh et al. | |
| 9,150,124 | B2* | 10/2015 | Becker | B60N 2/0881 |
| 9,272,639 | B2* | 3/2016 | Lee | B60N 2/0875 |
| 9,481,266 | B2* | 11/2016 | Kim | B60N 2/0806 |
| 9,604,551 | B2* | 3/2017 | Kim | B60N 2/0875 |
| 10,486,557 | B2* | 11/2019 | Sportelli | B60N 2/0881 |
| 10,710,475 | B2* | 7/2020 | Jang | B60N 2/0875 |
| 10,933,772 | B2 | 3/2021 | Sprenger | |
| 11,027,629 | B2* | 6/2021 | Krpo | B60N 2/0875 |
| 11,110,826 | B2* | 9/2021 | Spagnoli | B60N 2/0887 |
| 2003/0006355 | A1 | 1/2003 | Horsfield | |
| 2009/0051208 | A1 | 2/2009 | Szybisty et al. | |
| 2020/0391619 | A1 | 12/2020 | Krpo et al. | |
| 2020/0391620 | A1* | 12/2020 | Krpo | B60N 2/0875 |
| 2020/0398704 | A1 | 12/2020 | Krpo et al. | |
| 2020/0406785 | A1 | 12/2020 | Krpo et al. | |
| 2021/0046851 | A1 | 2/2021 | Spagnoli et al. | |
| 2021/0053469 | A1 | 2/2021 | Spagnoli et al. | |
| 2021/0245632 | A1* | 8/2021 | Spagnoli | B60N 2/0806 |

FOREIGN PATENT DOCUMENTS

| | | | |
|---|---|---|---|
| CN | 207274475 U | 4/2018 | |
| DE | 102014104295 A1 | 10/2015 | |
| DE | 102014220476 A1 | 2/2016 | |
| FR | 2893277 B1 * | 5/2009 | B60N 2/0881 |
| FR | 3032657 A1 | 8/2016 | |
| TW | M506740 U | 8/2015 | |
| WO | 2014049238 A1 | 4/2014 | |

* cited by examiner

SLIDING DEVICE FOR A VEHICLE SEAT PROVIDED WITH AN IMPROVED LOCKING ARRANGEMENT

TECHNICAL FIELD OF THE INVENTION

The present invention relates to a sliding device for a vehicle seat provided with an improved locking arrangement.

More particularly, the present invention relates to a sliding device for a vehicle seat provided with a locking arrangement having a compact construction and an improved reliability.

PRIOR ART

Vehicle seats generally have a sliding function for pushing or pulling the seat cushion in a forward or backward direction, a height adjustment function for adjusting the height of the seat cushion, and a reclining function for adjusting the inclination of the seat backrest relative to the seat cushion.

The aforesaid sliding function is generally implemented by a sliding device which comprises a pair of parallel tracks, each of which comprises a lower rail attached to the vehicle floor and an upper rail attached to the vehicle seat, the upper rail being constrained to the lower rail, but being able to slide relative to said lower rail.

The sliding device further comprises a locking arrangement for allowing/preventing a movement of the upper rails relative to the lower rails. Such locking arrangement is normally in a locking configuration, in which it prevents the upper rails from sliding with respect to the lower rails, thus avoiding accidental displacements of the seat with respect to the vehicle floor.

Such locking arrangement normally comprises a pair of locking assemblies, one for each track.

The sliding device is further provided with a releasing member which can be used by a user for moving the locking assemblies of the locking arrangement to an unlocking configuration, in which the upper rails are free to move relative to the lower rails, so that the position of the seat with respect to the vehicle floor can be adjusted. Such releasing member can be made, for instance, as a "U"-shaped handle or towel bar having two substantially parallel arms, the end portions of which are configured to simultaneously act upon respective locking assemblies for driving them to their unlocking configuration. Sliding devices are known from the art in which, in order to provide a positive engagement between the upper and lower rails, the lower rail of each track is provided with a series of apertures, aligned and preferably equally spaced from one another along the longitudinal axis of said lower rail, and each locking assembly is connected to the respective upper rail and comprises one or more locking pins configured to penetrate into respective apertures of the lower rail and engage with the edge of said apertures.

Preferably, several locking pins are provided and the size of said locking pins, the distance between said locking pins, the size of the apertures in the lower rails and the distance between said apertures are chosen so that at least one locking pin is always aligned with a corresponding aperture, so that it can penetrate into said aperture and engage the edge thereof.

Most preferably, the size of said locking pins, the distance between said locking pins, the size of the apertures in the lower rails and the distance between said apertures are chosen so that at least a first locking pin is positioned so as to penetrate into a corresponding aperture and engage the forward side of the edge thereof and at least a second locking pin is positioned so as to penetrate into a corresponding aperture and engage the rearward side of the edge thereof, whereby a "checkless" engagement is obtained.

Such locking pins are normally biased, e.g. by means of springs, to a locking configuration, in which at least some of them engage respective apertures of the lower rails.

In order to move the locking assemblies to their unlocking configuration for adjusting the position of the vehicle seat with respect to the vehicle floor, a releasing member—such as a releasing towel bar or handle—is provided, which acts upon respective connecting members, one for each locking assembly: said connecting members, in turn, act upon the locking pins of the respective locking assembly for moving them to an unlocking configuration, in which they are disengaged from the apertures of the respective lower rail. To this purpose, the locking pins are generally provided with an enlarged head and the connecting members are provided with fork-shaped elements adapted to engage the pin heads for extracting said pins from the apertures of the lower rails.

Such locking arrangements for a sliding device for vehicle seats are disclosed, for instance, in documents US 2003/006355, U.S. Pat. Nos. 7,980,525 and 6,637,712.

However, a locking arrangement of the kind disclosed in the aforesaid documents is not free from drawbacks.

More particularly, in the known locking arrangements the connecting members connecting the releasing member to the locking assemblies are either partially or completely arranged outside the tracks of the sliding device.

This entails the need for providing enough room for receiving said connecting members when designing the sliding device.

Moreover, as they are at least partially arranged outside the tracks of the sliding device, such connecting members are exposed to dust and dirt, which may accumulate between the moving parts of these connecting members and cause malfunctioning thereof.

Such dust and dirt may also penetrate into the tracks of the sliding device and interfere with the movement of the locking pins from their locking configuration to their unlocking configuration, and vice versa. Usual malfunctioning issues include increased release efforts, increased sliding efforts and noise issues, which may trigger users' dissatisfaction. Therefore, a main object of the present invention is to provide a sliding device for a vehicle seat provided with an improved locking arrangement having a compact structure. A further object of the present invention is to provide a sliding device for a vehicle seat provided with an improved locking arrangement showing an improved reliability, namely avoiding the risk of malfunctioning due to accumulation of dirt and dust close to the moving parts of said locking arrangement.

These and other objects are achieved by a sliding device as claimed in the appended claims.

SUMMARY OF THE INVENTION

The invention relates to sliding device for a vehicle seat which comprises a pair of parallel tracks, each including a lower rail, intended to be attached to the vehicle floor, and an upper rail, intended to be attached to the vehicle seat and slidably mounted to said lower rail, each lower rail comprising a plurality of apertures, aligned and equally spaced from one another along the longitudinal axis of said lower rail.

The sliding device further comprises a locking arrangement which comprises a locking assembly associated to each track for selectively allowing/preventing a movement of said upper rails relative to said lower rails. Each locking assembly is connected to a respective upper rail and comprises one or more locking pins configured to penetrate into corresponding apertures of the respective lower rail and to engage the edges of said apertures, said locking pins being biased to a locking configuration, for instance by spring means.

According to a preferred embodiment of the invention, each locking assembly comprises a plurality of locking pins. According to a particularly preferred embodiment of the invention, such locking pins are sized and arranged so that, for any position of the upper rail relative to the lower rail, at least one locking pin is aligned with a corresponding aperture of the respective lower rail and can penetrate into said aperture and engage the edge thereof.

The locking arrangement is further provided with a releasing assembly for simultaneously switching said locking assemblies from a locking configuration, in which the movement of the upper rails of the tracks relative to the respective lower rails is prevented, to an unlocking configuration, in which the movement of said upper rails relative to the respective lower rails is allowed.

Said releasing assembly comprises a releasing member and a pair of connecting members, one for each locking assembly, each of said connecting members being in a force transmission connection with the releasing member, on one hand, and with the locking pins of the respective locking assembly, on the other hand.

Accordingly, when a user applies a force to the releasing member, such force is transmitted from the releasing member to the connecting members, and from said connecting members to the locking pins of the respective locking assembly, thus driving said locking pins from their locking configuration to their unlocking configuration.

According to the invention, such connecting members are entirely received inside the respective tracks, and they are arranged between the upper rail and the lower rail of the respective track.

This arrangement allows to obtain a compact structure, which turns out to be advantageous in packaging the sliding device with respect to the external release systems proposed in the prior solutions, in which the connecting members of the releasing assembly are arranged at least partially outside the respective tracks.

According to a preferred embodiment of the invention, each locking assembly comprises a support plate, which is fastened (e.g. welded and/or staked) to the respective upper rail and is provided with a window through which the locking pins can slide for moving from their unlocking configuration to their locking configuration, and vice versa.

Each connecting member is correspondingly made as a spring plate which comprises an engaging portion for engagement with the releasing member, a driving portion for driving the locking pins from their locking configuration to their unlocking configuration, and a connecting portion for connection to the support plate of the locking assembly.

According to this preferred embodiment, when a user applies a force to the releasing member, such force is transmitted to the spring plate and causes a rotation of said spring plate, which, in turn, drives the locking pins to their unlocking configuration.

According to a preferred embodiment of the invention, the locking pins are provided with transversely projecting pegs and the driving portion of the spring plate comprises a window having a width larger than the diameter of the locking pins but smaller than the sum of the diameter of the locking pins and the length of the projecting pegs, so that the edge of the window of the driving portion of the spring plate can engage such pegs for driving the locking pins to their unlocking configuration.

According to a preferred embodiment of the invention, the releasing member is made as a "U"-shaped handle having two substantially parallel arms and the engaging portion of each spring plate is configured to receive the end portion of a respective arm of said releasing handle.

BRIEF DESCRIPTION OF THE DRAWINGS

Further features and advantages of the invention will become more evident from the detailed description of a preferred embodiment thereof, given by way of non limiting example, with reference to the attached drawing, in which:

FIG. 5b partially shows, in a perspective, partially cutaway view, the locking arrangement of FIG. 5a;

DETAILED DESCRIPTION OF A PREFERRED EMBODIMENT OF THE INVENTION

Figure 1:
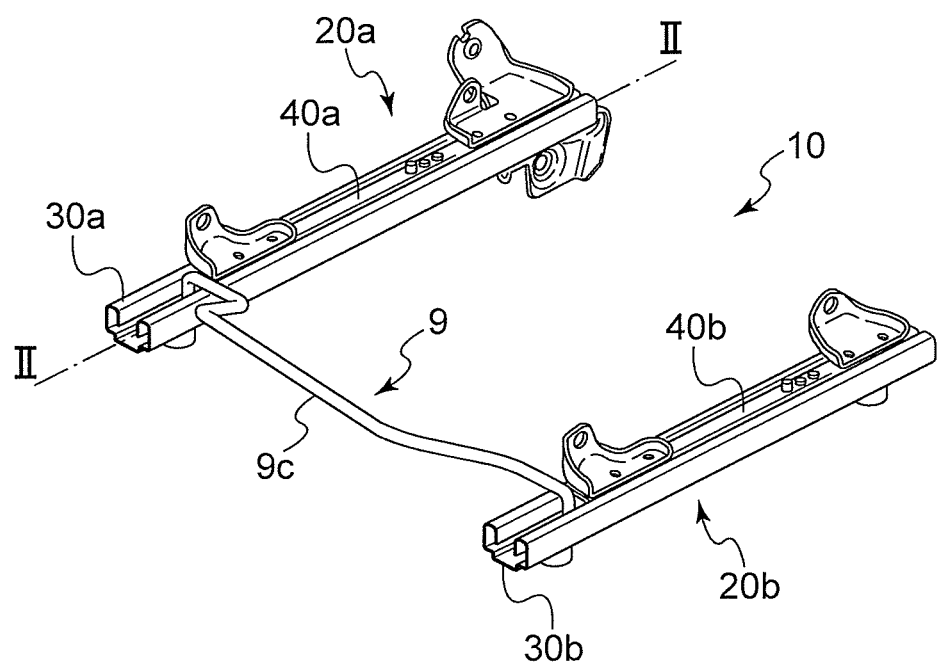
FIG. 1 is a perspective view of a sliding device according to the invention.

With reference to FIG. 1, a sliding device 10 according to the invention is shown.

In a per se known manner, the sliding device 10 comprises a pair of parallel tracks 20a, 20b, each comprising a lower rail 30a, 30b, intended to be attached to the vehicle floor, and an upper rail 40a, 40b, intended to be attached to the frame of a vehicle seat.

Each upper rail 40a, 40b is constrained to the respective lower rail 30a, 30b, but can slide relative to said lower rail.

In order to selectively allow/prevent a sliding movement of the upper rails relative to the lower rails of the tracks 20a, 20b, a locking arrangement is provided. Said locking arrangement comprises two locking assemblies, one for each track 20a, 20b.

Figure 2:
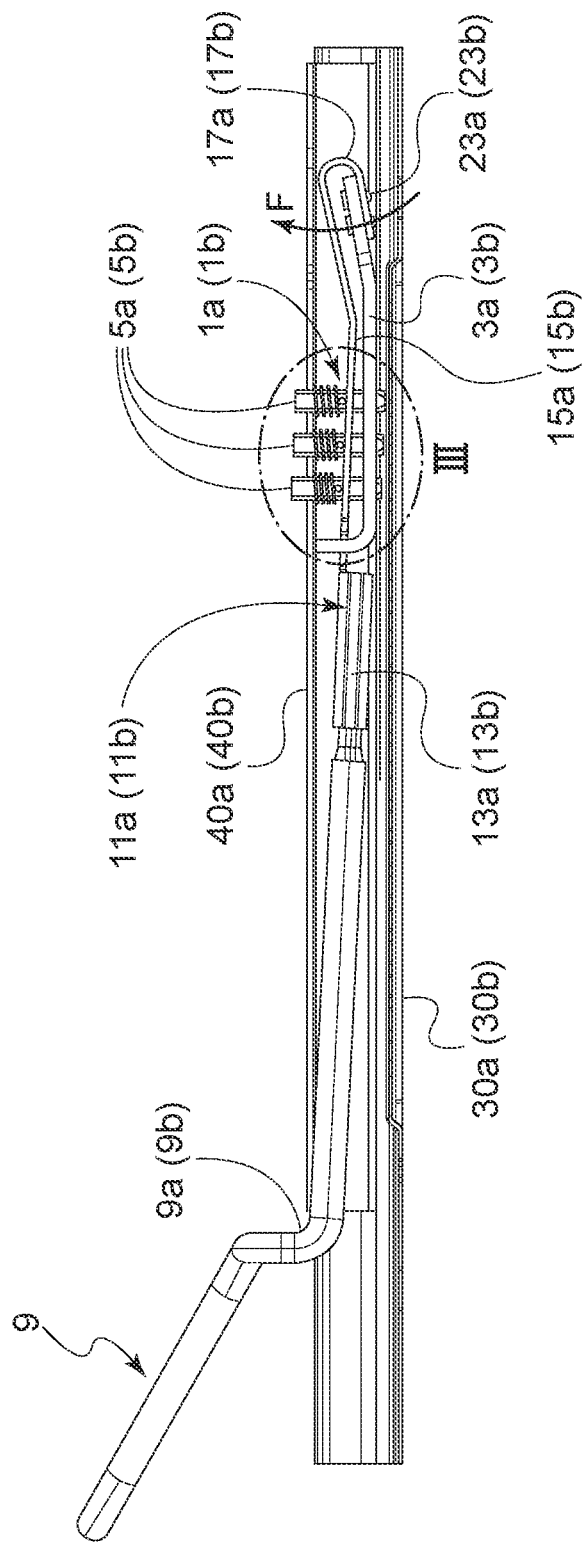
FIG. 2 is a cross-sectional view of the sliding device of FIG. 1 taken along the line II-II.
Figure 3A:
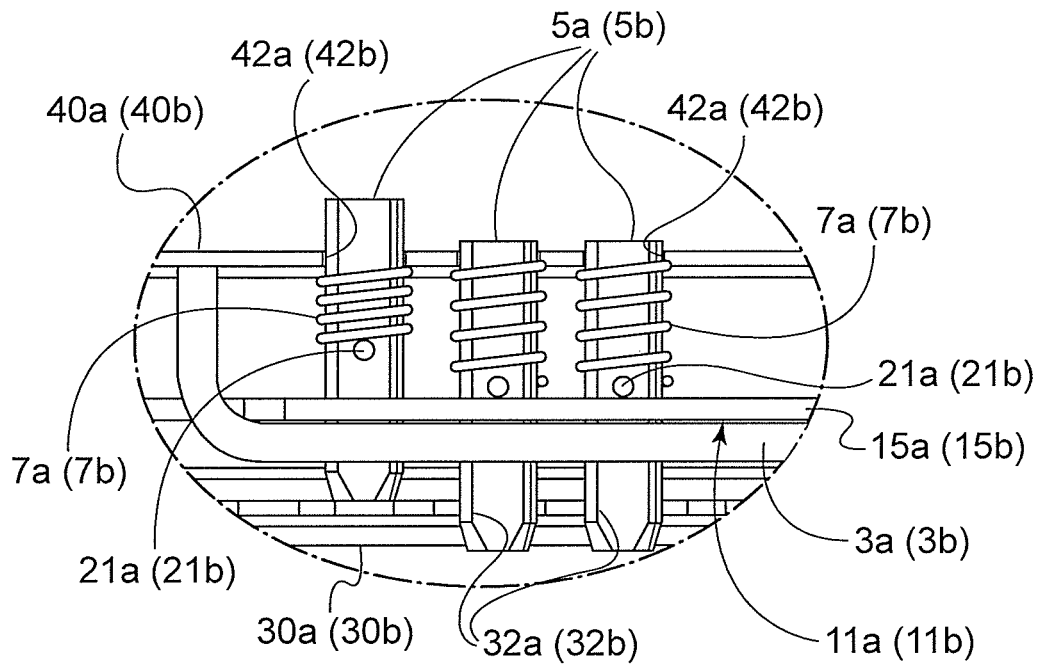
FIG. 3a is an enlarged view of the detail III of FIG. 2, illustrated in a first, locking configuration.
Figure 3B:
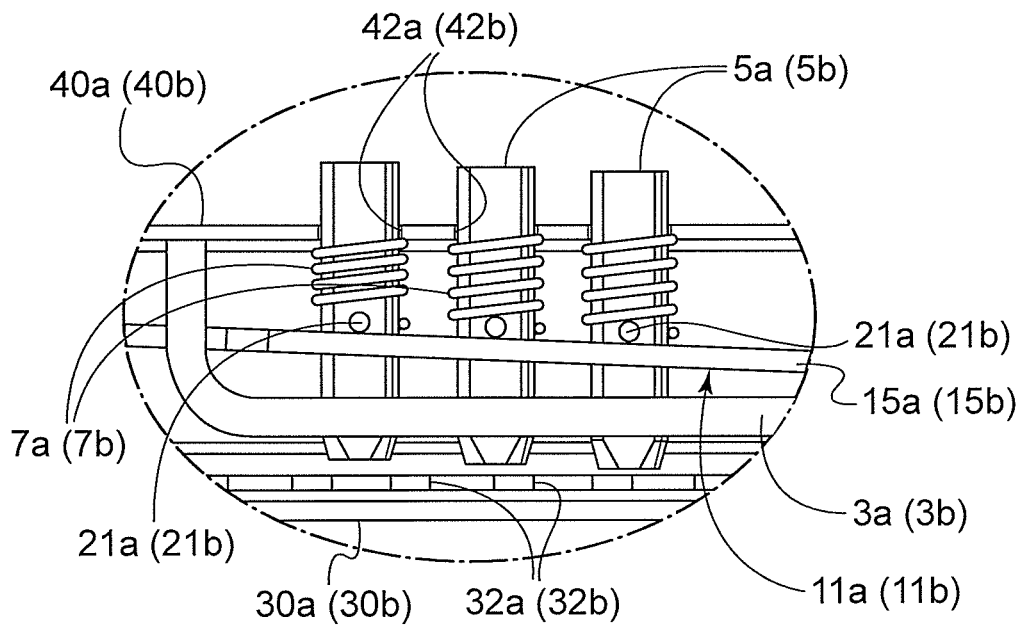
FIG. 3b is an enlarged view of the detail III of FIG. 2, illustrated in a second, unlocking configuration.
Figure 4:
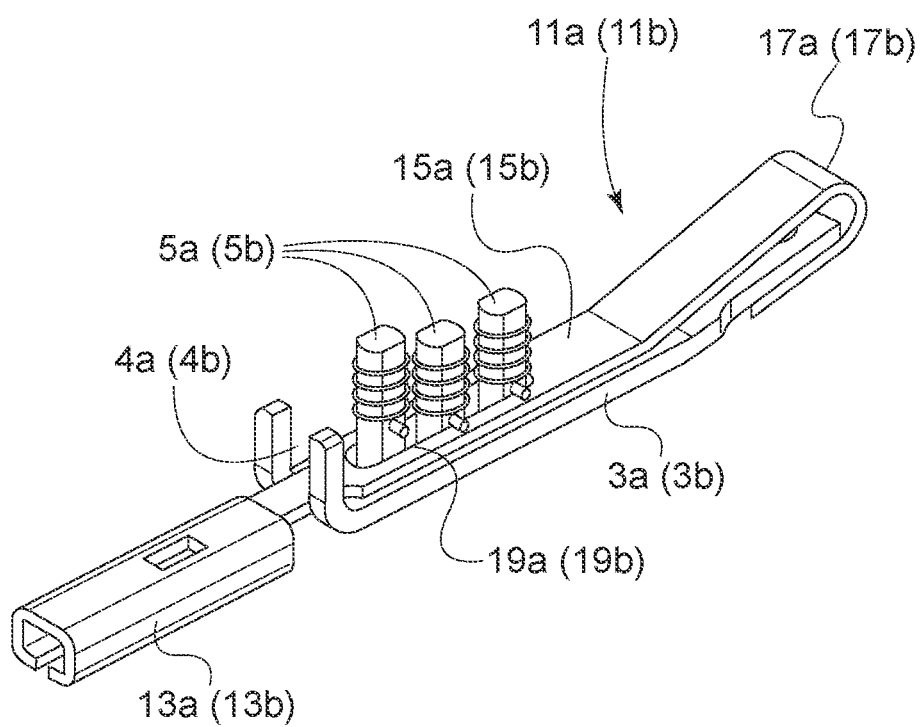
FIG. 4 is a perspective view of the connecting member of the locking assembly of FIG. 2.

One of said locking assemblies is shown in FIGS. 2-4. It is to be intended that the other locking assembly is identical to the one shown in FIGS. 2-4.

Each locking assembly 1a, 1b comprises a support plate 3a, 3b, which is fastened (e.g. welded and/or staked) to the respective upper rail 40a, 40b, and one or more locking pins 5a, 5b (three in the shown embodiment), which are configured to pass through apertures 42a, 42b provided in the respective upper rail 40a, 40b and through a window provided in the support plate 3a, 3b and penetrate into apertures provided in the respective lower rail 30a, 30b for locking the upper rails to the lower rails and preventing any movements of said upper rails relative to said lower rails.

As will be disclosed in greater detail below, the locking pins 5a, 5b are arranged so that, at any position of the upper rails relative to the lower rails, at least one of them—and preferably two of them—is aligned with a corresponding aperture of the respective lower rail and penetrates therethrough.

The locking pins 5a, 5b have a substantially cylindrical body ending with a conical or frusto-conical tip for facilitating their insertion into said apertures of the lower rails.

The locking pins 5a, 5b are biased to their locking configuration, in which at least some of them penetrate into corresponding apertures of the respective lower rail. To this purpose, a helical spring 7a, 7b is wound around the body of each locking pin 5a, 5b and biases such locking pin downwards, towards the lower rail.

In order to allow a user to adjust the position of the seat relative to the vehicle floor, the locking arrangement of the sliding device according to the invention also comprises a releasing assembly for moving the locking pins 5a, 5b from the aforesaid locking configuration to an unlocking configuration, in which all the locking pins are extracted from the apertures of the respective lower rail, thus allowing the upper rails to slide relative to the lower rails.

In general, the releasing assembly comprises a releasing member 9 and a pair of connecting members 11a, 11b, one for each locking assembly 1a, 1b, each connecting member being in a force transmission connection with the releasing member 9, on one hand, and with the locking pins 5a, 5b of the respective locking assembly, on the other hand.

According to the invention, the connecting members 11a, 11b are entirely received inside the respective tracks 20a, 20b, each of said connecting members being arranged between the upper rail and the lower rail of the respective track.

In the shown embodiment, the releasing member is made as a "U"-shaped releasing handle or towel bar 9 comprising a middle gripping portion 9c and two substantially parallel arms 9a, 9b, each penetrating into a respective track 20a, 20b.

As better visible in FIG. 4, in the shown embodiment each connecting member is made as a spring plate 11a, 11b which is arranged above the support plate 3a, 3b of the locking assembly and substantially extends from the rear end of said support plate and projects beyond the front end of said support plate, which is correspondingly provided with a channel 4a, 4b for the passage of said spring plate.

The spring plate 11a, 11b comprises an engaging portion 13a, 13b for engaging the respective arm 9a, 9b of the releasing handle 9, a driving portion 15a, 15b for driving the locking pins 5a, 5b of the respective locking assembly 1a, 1b from their locking configuration to their unlocking configuration, and a connecting portion 17a, 17b for connection to the support plate 3a, 3b of the respective locking assembly 1a, 1b.

The engaging portion 13a, 13b is made as a hollow body configured to receive and engage the end portion of a respective arm 9a, 9b of the releasing handle.

The driving portion 15a, 15b is made as a flat body, which is arranged above the support plate 3a, 3b of the respective locking assembly and is provided with a window 19a, 19b, which preferably overlies the window of said support plate 3a, 3b, so that the locking pins 5a, 5b can slide through both the window of the support plate 3a, 3b and the window 19a, 19b of the driving portion 15a, 15b of the spring plate 11a, 11b.

As better visible in FIGS. 3a and 3b, for allowing the locking pins 5a, 5b to be driven by the spring plate 11a, 11b, such locking pins are provided with transversely projecting pegs 21a, 21b. Preferably, each locking pin 5a, 5b is provided with two diametrically opposed transversely projecting pegs 21a, 21b.

The window 19a, 19b of the driving portion of the spring plate is designed so that its width is larger than the diameter of the locking pins 5a, 5b, but smaller than the sum of the diameter of said locking pins and of the length of the transversely projecting pegs 21a, 21b.

Said transversely projecting pegs 21a, 21b are arranged on the body of the locking pins 5a, 5b so that they are substantially in abutment against the driving portion 15a, 15b of the spring plate 11a, 11b when the locking pins are completely inserted into the apertures 32a, 32b of the lower rails 30a, 30b (locking configuration).

The connecting portion 17a, 17b of the spring plate 11a, 11b is made as a flat body downwardly bent into a "C" shape, so that its end can be connected (e.g. by means of rivets 23a, 23b) to the underside of the support plate 3a, 3b of the respective locking assembly.

The operation of the locking arrangement of the sliding device according to the invention can be summarized as follows.

In a rest condition, the springs 7a, 7b bias the locking pins 5a, 5b of the locking assemblies 1a, 1b towards the apertures 32a, 32b of the lower rails 30a, 30b and at least some of said locking pins penetrate into corresponding apertures of the respective lower rail (see FIG. 3a). In such a locking configuration, the upper rails 40a, 40b cannot slide relative to the lower rails 30a, 30b.

When a user wishes to adjust the position of the vehicle seat relative to the vehicle floor, he/she applies a force to the releasing handle 9, by pulling the middle gripping portion 9c of said handle upwards.

As a result, the spring plate 11a, 11b is also pulled upwards and it rotates about the connecting point to the support plate 3a, 3b (see arrow F in FIG. 2).

More particularly, the driving portion 15a, 15b of the spring plate moves upwards and the edge of the window 19a, 19b engages the transversely projecting pegs 21a, 21b of the locking pins 5a, 5b. By overcoming the elastic resistance of the springs 7a, 7b, the driving portion 15a, 15b of the spring plate lifts the locking pins 5a, 5b, so that they move upwards (guided by the apertures 42a, 42b of the respective upper rail) until they become disengaged from the apertures 32a, 32b of the respective lower rail 30a, 30b (see FIG. 3b). In such an unlocking configuration, the upper rails 40a, 40b can slide relative to the lower rails 30a, 30b and the position of the vehicle seat can be adjusted.

When the user releases the releasing handle 9, the springs 7a, 7b bias the locking pins 5a, 5b back towards the respective lower rail 30a, 30b, and at least some of said locking pins penetrate into corresponding apertures of said lower rail, thus locking the upper rail relative to the lower rail in a new, desired position.

Figure 5A:
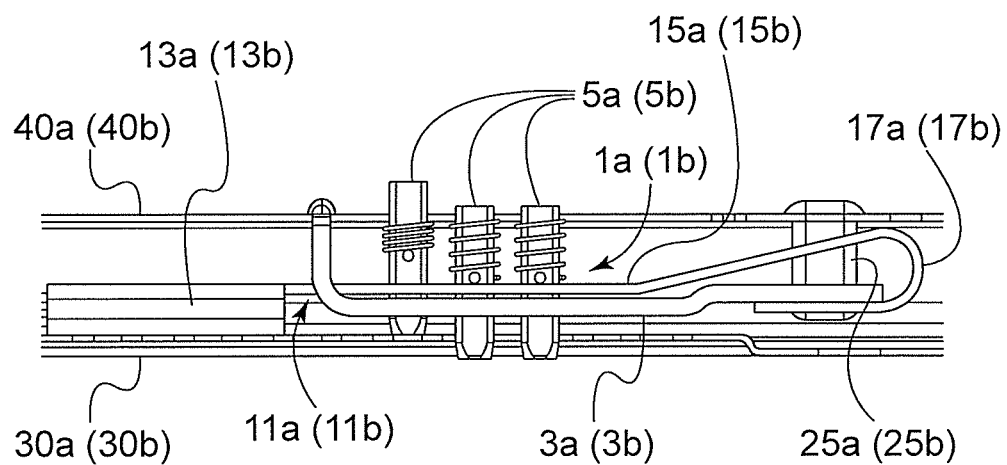
FIG. 5a partially shows, in a cross-sectional view, the locking arrangement of a sliding device according to a variant of the invention.
Figure 5B:
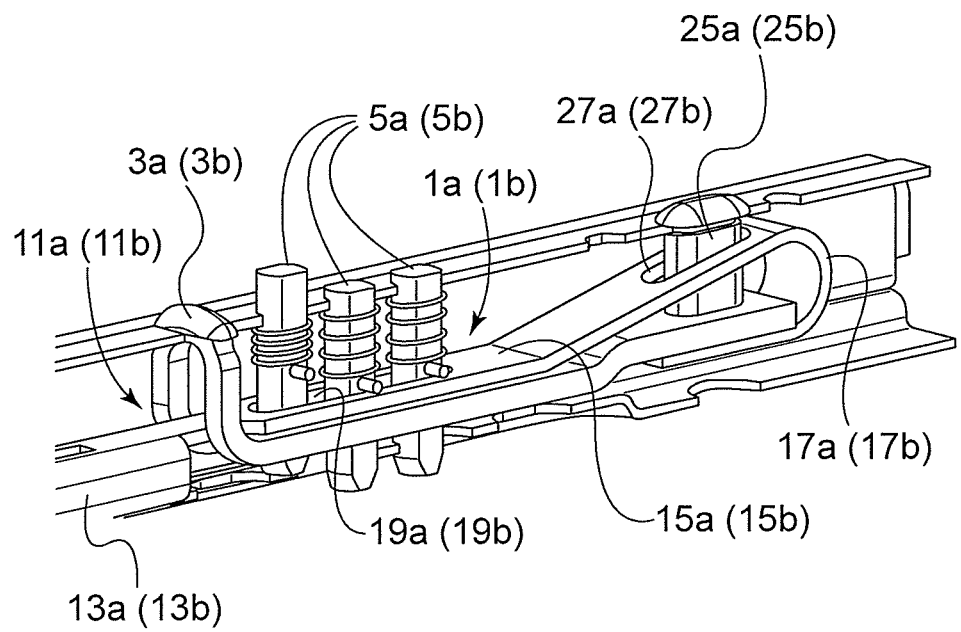

The locking arrangement of the sliding device according to a variant of the invention is partially shown in FIGS. 5a-5b.

The locking arrangement according to such variant is similar to the one shown in FIGS. 2-4 and comprises a pair of locking assemblies 1a, 1b and a releasing assembly including a releasing member and a pair of connecting members 11a, 11b, one for each locking assembly.

In this variant, too, each locking assembly 1a, 1b comprises a support plate 3a, 3b and a plurality of locking pins 5a, 5b.

However, in this variant, the support plate 3a, 3b is not fastened to the respective upper rail by welding or staking; on the contrary, each support plate 3a, 3b is fastened to the respective upper rail by riveting, namely by orbital riveting.

The connecting portion 17a, 17b of the spring plate 11a, 11b is correspondingly fastened by riveting, namely by orbiting riveting, both to the support plate 3a, 3b and to the upper rail 40, 40b.

To this purpose, a rivet 25a, 25b is provided, the upper shoulder of which engages the upper rail and provides for the connection between the connecting portion 17a, 17b of the spring plate 11a, 11b and said upper rail, and the lower shoulder of which engages the underside of the support plate and provides for the connection between the connecting portion 17a, 17b of the spring plate 11a, 11b and said support plate.

It is to be noted that the upper section of the connecting portion 17a, 17b of the spring plate 11a, 11b is provided with a slot 27a, 27b, the length of which is larger than the thickness of the stem of the rivet 25a, 25b, so that said rivet does not interfere with the movements of the spring plate 11a, 11b when the locking pins move from their locking configuration to their unlocking configuration and vice versa.

Thanks to this solution, welded connections can be avoided and the locking assemblies and the connecting members can be fastened to each other and to the respective upper rail by cold working.

This prevents the risk of distortion of the rails induced by heat during welding operation and represents a remarkable advantage, since such distortion of the rails may entail high sliding efforts and noise issues.

Figure 6A:
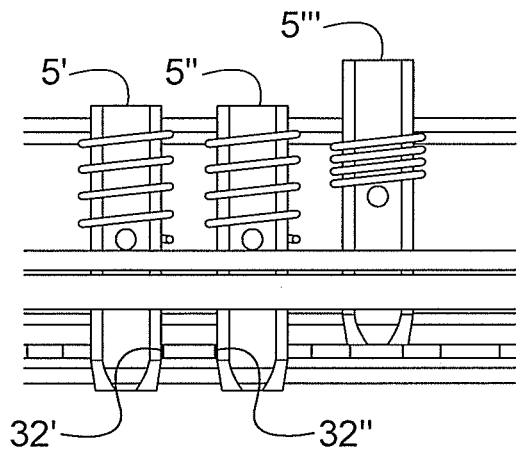
FIG. 6a shows a first locking configurations of the locking pins of the locking assembly of FIG. 2.
Figure 6B:
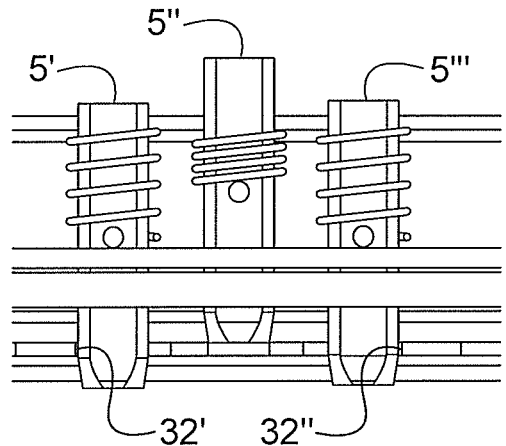
FIG. 6b shows a second locking configurations of the locking pins of the locking assembly of FIG. 2.
Figure 6C:
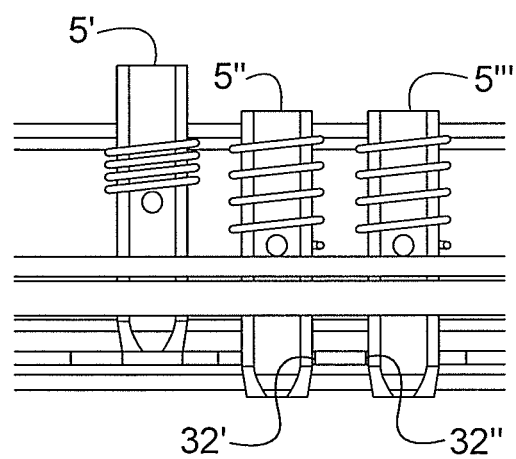
FIG. 6c shows a third locking configurations of the locking pins of the locking assembly of FIG. 2.

Referring now to FIGS. 6a-6c, possible locking configurations of the locking pins 5a, 5b are schematically shown.

The size of said locking pins 5a, 5b, the distance between said locking pins, the size of the apertures 32a, 32b in the lower rails and the distance between said apertures can be chosen so as to obtain a "chuckless" engagement.

In a first possible configuration, shown in FIG. 6a, the middle pin 5" penetrates into an aperture 32" of the lower rail and engages the front side of its edge (primary locking), while the front pin 5' penetrates into a further aperture 32' of the lower rail, immediately preceding the aperture 32", and engages the rear side of its edge (secondary locking); the rear pin 5''' does not penetrate into any aperture of the lower rail and abuts against the web between two adjacent apertures (namely, the aperture 32" and the following one).

In a second possible configuration, shown in FIG. 6b, the front pin 5' penetrates into an aperture 32' of the lower rail and engages the front side of its edge (primary locking), while the rear pin 5''' penetrates into a further aperture 32" of the lower rail, immediately following the aperture 32', and engages the rear side of its edge (secondary locking); the middle pin 5" does not penetrate into any aperture of the lower rail and abuts against the web between two adjacent apertures (namely, the apertures 32' and 32").

In a third possible configuration, shown in FIG. 6c, the rear pin 5''' penetrates into an aperture 32" of the lower rail and engages the front side of its edge (primary locking), while the middle pin 5" penetrates into another aperture 32' of the lower rail, immediately preceding the aperture 32", and engages the rear side of its edge (secondary locking); the front pin 5' does not penetrate into any aperture of the lower rail and abuts against the web between two adjacent apertures (namely, the aperture 32' and the preceding one).

The above description of a preferred embodiment of the invention has been given merely by way of example and several variants and modifications within the reach of the person skilled in the art can be envisaged, without departing from the scope of the invention as defined by the appended claims.

The invention claimed is:

1. A sliding device for a vehicle seat, the sliding device comprising:
   a pair of parallel tracks, each of the tracks comprising a lower rail and an upper rail, each of the upper rails being constrained to a respective one of the lower rails, but slidable relative to the respective one of the lower rails,
   wherein each of the lower rails has a longitudinal axis, and wherein each of the upper rails has a longitudinal axis,
   wherein the lower rails are each provided with a plurality of apertures arranged along the longitudinal axes of the lower rails,
   wherein the sliding device is provided with a locking arrangement including two locking assemblies, wherein each of the locking assemblies is provided for a respective one of the tracks,
   wherein each of the locking assemblies comprises a support plate fastened to a respective one of the upper rails, and wherein each of the locking assemblies comprises one or more locking pins, which are configured to pass through a window provided in a respective one of the support plates and penetrate into corresponding one or more apertures of the plurality of apertures of a respective one of the lower rails,
   wherein the locking arrangement further comprises a releasing assembly for moving the one or more locking pins of each of the locking assemblies from a locking configuration to an unlocking configuration,
   wherein the releasing assembly comprises a releasing member and a pair of connecting members, wherein each of the connecting members is provided for a respective one of the locking assemblies,
   wherein the releasing member is a U-shaped releasing handle comprising a middle gripping portion and two substantially parallel arms, each of the arms penetrating into a respective one of the tracks and having a first end connected to the middle gripping portion of the U-shaped releasing handle and a second, free end opposite to the first end,
   wherein each of the support plates has a front end and a rear end positioned along the longitudinal axis of the respective one of the upper rails, such that the front end of the support plate of each of the locking assemblies is closer to the middle gripping portion of the U-shaped releasing handle than the rear end of the support plate of each of the locking assemblies,
   wherein each of the connecting members is entirely received inside a respective one of the tracks and is arranged between the upper rail of the respective one of the tracks and the lower rail of the respective one of the tracks,
   wherein each of the connecting members of the releasing assembly is a spring plate, which is arranged above the support plate of the respective one of the locking assemblies adjacent the window of the support plate of the respective one of the locking assemblies and substantially extends from the rear end of the support plate of the respective one of the locking assemblies and projects beyond the front end of the support plate of the respective one of the locking assemblies, wherein each of the spring plates comprises an engaging portion for engaging the U-shaped releasing handle, a driving portion for driving the one or more locking pins of the respective one of the locking assemblies from the locking configuration to the unlocking configuration, and a connecting portion for connecting the spring plate to the support plate of the respective one of the locking assemblies, wherein each of the spring plates is connected in a force transmission connection with the second, free end of a respective one of the arms of the U-shaped releasing handle and with the one or more locking pins of the respective one of the locking assemblies.

2. The sliding device according to claim 1, wherein the engaging portion of each of the spring plates is a hollow body configured to receive and engage the second, free end of a respective one of the arms of the U-shaped releasing handle.

3. The sliding device according to claim 1, wherein each of the one or more locking pins of each of the locking assemblies has a diameter, wherein each of the one or more locking pins of each of the locking assemblies is provided with transversely projecting pegs having a length, and wherein the driving portion of each of the spring plates of the releasing assembly is made as a flat body provided with a window, the window of the driving portion of each of the spring plates of the releasing assembly having a width which is larger than the diameter of each of the one or more locking pins of a respective one of the locking assemblies, but smaller than a sum of the diameter of any one of the one or more locking pins of the respective one of the locking assemblies and the length of the transversely projecting pegs of any one of the one or more locking pins of the respective one of the locking assemblies.

4. The sliding device according to claim 3, wherein each of the transversely projecting pegs of each of the one or more locking pins of each of the locking assemblies is arranged on a body of a respective one of the one or more locking pins of a respective one of the locking assemblies so that the transversely projecting pegs of each of the one or more locking pins of each of the locking assemblies are substantially in abutment against the driving portion of a respective one of the spring plates of the releasing assembly when the one or more locking pins of each of the locking assemblies are completely inserted into the corresponding one or more apertures of the plurality of apertures of the respective one of the lower rails.

5. The sliding device according to claim 1, wherein the connecting portion of each of the spring plates has a C-shaped body, so that an end of the connecting portion of each of the spring plates is connected to an underside of the support plate of the respective one of the locking assemblies.

6. The sliding device according to claim 1, wherein the connecting portion of each of the spring plates is connected by orbital riveting to the support plate of the respective one of the locking assemblies and to a respective one of the upper rails and wherein the support plate of each of the locking assemblies is connected by orbital riveting to the respective one of the upper rails.

7. The sliding device according to claim 1, wherein each of the one or more locking pins of each of the locking assemblies has at least one transversely projecting peg.

8. The sliding device according to claim 1, wherein each of the one or more locking pins of each of the locking assemblies includes a spring for biasing each of the one or more locking pins of each of the locking assemblies toward the plurality of apertures of the respective one of the lower rails.

9. The sliding device according to claim 1, wherein each of the one or more locking pins of each of the locking assemblies has two diametrically opposed transversely projecting pegs.

* * * * *